United States Patent [19]

Swinehart et al.

[11] 4,089,937
[45] May 16, 1978

[54] METHOD OF MAKING AN IONIC FLUORIDE OPTICAL BODY WITH REDUCTION OF ABSORPTION BANDS

[75] Inventors: Carl F. Swinehart, University Heights; Herbert Packer, Cleveland Heights, both of Ohio

[73] Assignee: The Harshaw Chemical Company, Cleveland, Ohio

[21] Appl. No.: 779,623

[22] Filed: Mar. 21, 1977

Related U.S. Application Data

[63] Continuation-in-part of Ser. No. 391,890, Aug. 27, 1973, Pat. No. 4,013,796.

[51] Int. Cl.² .................. C01F 11/22; C01F 17/00; C01F 5/28; C01B 9/08
[52] U.S. Cl. ................................ 423/490; 423/263; 423/464; 423/489
[58] Field of Search ............... 423/490, 489, 263, 464

[56] References Cited

U.S. PATENT DOCUMENTS

| | | | |
|---|---|---|---|
| 3,282,641 | 11/1966 | Sfiligoj et al. | 423/490 X |
| 3,365,271 | 1/1968 | Carnall, Jr. et al. | 423/490 |
| 3,408,430 | 10/1968 | Lachman | 423/490 X |
| 3,565,700 | 2/1971 | Root | 423/490 X |
| 3,816,600 | 6/1974 | Huizing et al. | 423/489 |
| 3,920,802 | 11/1975 | Moss et al. | 423/489 X |
| 4,013,796 | 3/1977 | Swinehart et al. | 423/489 X |

FOREIGN PATENT DOCUMENTS

| | | | |
|---|---|---|---|
| 1,011,257 | 11/1965 | United Kingdom | 423/490 |

*Primary Examiner*—Edward Stern
*Attorney, Agent, or Firm*—Alfred D. Lobo; James A. Lucas

[57] ABSTRACT

A hot-pressed optical body which is free from absorption bands due to carbon dioxide, water, hydroxyl ion and acid fluorides in the ultraviolet, visible and near-infrared wavelength regions. Typically, the optical body is formed from a powder of an alkaline earth metal fluoride, alkali metal fluoride, or rare earth metal fluoride. One or more absorption bands due to a single impurity may be reduced or eliminated, or bands due to plural impurities may be reduced or eliminated sequentially, or simultaneously. The optical body is made by flowing a reactive, reducing gas, optionally, in combination with hydrogen fluoride gas, directly into the die cavity containing a pressable ionic fluoride powder, and either hot-pressing or extruding the powder.

8 Claims, 4 Drawing Figures

METHOD OF MAKING AN IONIC FLUORIDE OPTICAL BODY WITH REDUCTION OF ABSORPTION BANDS

CROSS-REFERENCE TO RELATED APPLICATION

This application is a continuation-in-part of applicants' copending application, Ser. No. 391,890 filed Aug. 27, 1973 and now issued as U.S. Pat. No. 4,013,796.

BACKGROUND OF THE INVENTION

This invention relates to high-quality optics either hot-pressed or extruded from particulate pressable ionic fluorides selected from alkaline earth metal fluorides, alkali metal fluorides and rare metal fluorides. The finished optic is essentially free of absorption bands in the range from about 1 $\mu$ (micron) to about 14 $\mu$, due to impurities commonly exhibiting absorption bands occurring therewithin.

The application of hot-pressing techniques to pure powder ionic salts is a relatively recent development. It was on Jan. 6, 1958 that a sample of $MgF_2$ was produced "through which silhouettes, lights, etc. could be distinguished." (See "Optical Materials Research" by W. C. Parsons, *Applied Optics*, Vol. 11, No. 1, January 1972.) It is still difficult to produce material that is transparent to visible radiation, but this overlooks the fact that transmittance to near-ultraviolet, infrared and near-infrared wavelengths is not necessarily correlatable to transparency in the visible. More importantly, it overlooks the fact that, to date, no ionic powder optic, either hot-pressed or extruded, has been produced which is simultaneously free of absorption bands due to $CO_2$, $H_2O$, hydroxyl ($OH^-$) ion and acid fluorides (thought to be mainly $HF_2^-$ and homologous ions of a similar nature).

Prior to the present time, depending on the optical requirements of objects produced from a relatively thick hot-pressed slug, or extrudate, it is possible to diminish $CO_2$ impurity, that is, minimize but not eliminate the absorption band due to $CO_2$. This reduction in $CO_2$ impurity is usually effected at the expense of an increase in both hydroxyl ion and acid fluorides. The mechanism by which this apparent 'balance' occurs is not known, but is well-documented from experience. As a result, the highest quality optics are manufactured in recognition of this phenomenon and by effecting a delicate compromise, often at the expense of yield.

As the production of infrared and ultraviolet transmitting windows and other optical elements, formed particularly by hot-pressing powder fluorides of an alkali metal, alkaline earth metal and rare earth metal, for both military and industrial applications; has been gaining in importance over the past several years, increasingly stringent quality specifications are demanded. The alkaline earth metal fluorides such as magnesium fluoride and calcium fluoride are particularly sought after for relatively high transmittance optics in the ultraviolet, visible and near infrared wavelength regions. In addition to the alkaline earth metal fluorides, many lesser known powder ionic fluorides of one or more of the foregoing metals in combination with each other or with metals of other groups of the Periodic Table have analogous uses. The problems of absorption bands in the usable wavelength range of the lesser known ionic fluorides have been, to date, relatively less important and not surprisingly have received less attention. Therefore, hereinafter, in this specification, the invention will be focused by particular reference to hot-pressed magnesium fluoride and calcium fluoride bodies and to an extruded lithium fluoride body, it being recognized that the problems solved by this invention are common, though to different degrees, to other fluorides.

It is well known that hot-pressed magnesium fluoride and calcium fluoride bodies are not uniformly permeable to radiation throughout all regions of their so-called transmission spectra, but exhibit absorption bands which are undesirable in many applications. Absorption bands at about 1.4, 2.2, 2.3, 2.5, 2.6, 2.8, 2.9, 4.2, 5.0, and 6.7 $\mu$ wavelength, as well as the water absorption bands at 3.0 and 6.1 $\mu$ among others, are particularly troublesome in the development of high quality infrared wavelength transmitting elements made of the alkaline earth metal fluorides and rare earth metal fluorides.

Absorption bands in hot-pressed $MgF_2$ were recognized early in the development of optical bodies from hot-pressed powder. For example, a typical transmittance curve for $MgF_2$ (see "Hot-Pressing Magnesium Fluoride" by Buckner, Hafner and Kreidl, Jour. of the American Ceramic Soc. 45, No. 9, Pg. 435–438, 1962) shows several sharp absorption bands occurred at the frequency usually taken as O—H bending . . . " A few extraneous absorption bands . . . were observed infrequently, one of which was $CO_2$ absorbing at 4.2 $\mu$." (id. bott. col. 1 and top col. 2 at pg. 438.)

There is still some question as to the preceise identification and correlation of all the ions and their various absorption bands. However, the identity of the absorption bands due to water, carbon dioxide and hydroxyl ($OH^-$) ion, are recognized. Bands due to acid fluorides such as $HF_2^-$, $H_2F_3^-$, $H_5F_6^-$ and the like, have been generally either unrecognized or confused with other bands possibly because they were unresolved from other bands, particularly the band at 2.77 due to $OH^-$ ion. It is all these impurities, and their absorption bands, with which we are concerned.

With respect to $CO_2$ impurity, until recently, the absorption of $CO_2$ was lightly regarded, mainly because it is not significant in relatively thin optical bodies pressed individually, but with relatively thick bodies in excess of about 1.5 cm. thick, $CO_2$ absorption becomes a serious problem. Even thin sections in the range from about 2 to about 3 mm. in thickness, cut from these relatively thick bodies show undesirable $CO_2$ absorption. The elimination of carbon dioxide from anhydrous powder optic fluorides is difficult because of the stability of the $CO_2$ layer on the surface of the fluoride powder. Thus, carbon dioxide is not fully displaced by carbon tetrachloride or removed by acid vapors such as hydrochloric, sulfur dioxide, hydrogen fluoride or ammonium hydrogen fluoride. It cannot be eliminated by vacuum pumping even at 1 $\mu$ pressure at 700° C. The carbon dioxide layer on an alkaline earth metal fluoride protects the fluoride against hydrolysis which accounts for low hydroxyl group contamination in the presence of a relatively high level of carbon dioxide, while in the absence of carbon dioxide, hydrolysis proceeds at as low as about 50° C. Though absorption due to a relatively large amount of $CO_2$ may be reduced by evacuation of the die or by flowing an inert gas into the molding chamber, such conventional attempts to minimize the absorption bands due to $CO_2$ are ineffective in relatively thick bodies, and generally result in increased absorption bands for hydroxyl ion and for acid fluorides.

With respect to absorption bands due to hydroxyl (OH⁻) ion in magnesium fluoride, Eugene C. Letter, in U.S. Pat. No. 3,114,601, proposed to wet a loose magnesium fluoride powder with an aqueous solution of ammonium fluoride, dry the wetted powat about 125° C., and then place the mixture in an Alundum tube for about 1 hour at a temperature of between 400° and 600° C. The treated material is then placed in a die in which the powder is not-pressed to form the desired optical body. It is stated that the time of treatment is relatively unimportant and that the temperature may be varied within relatively wide limits. The optimum temperature range is stated to be from about 400° to about 600° C. Alternatively, aqueous concentrated hydrofluoric acid or anhydrous hydrofluoric acid may be used to wet the magnesium fluoride powder. The powder is thereafter dried prior to being hot-pressed. Another embodiment is to flow a reactive gas such as dry fluorine or anhydrous hydrofluoric acid through the magnesium fluoride, following similar procedures with respect to temperature and times.

The problem with the use of ammonium fluoride in a dry powder mix is that, at the temperatures at which hydroxyl ions are supposed to be substituted by fluorine ions, most of the ammonium fluoride has been driven off and therefore is unavailable for the purpose. Moreover the Letter patent is directed to the removal of OH absorption bands and is ineffective for the removal of $CO_2$ absorption bands so noticeable in thick slugs or hot-press bodies where the $CO_2$ does not have an opportunity to escape from the hot-pressed mass. In these prior art procedures the main objective is to remove water without permitting hydrolysis such as would produce a magnesium hydroxy-fluoride which is difficult to compact into an optical body without voids large enought to scatter light. These procedures are of little effect with respect to removal of very small amounts of carbon dioxide, and we are aware of no published study by others with respect to their effect on reduction of acid fluorides.

It has not been possible, until the invention set forth herein, to form either a hot-pressed or an extruded optical body of a pressable fluoride powder in which body the absorption bands due to the $CO_2$, $H_2O$, $OH^-$ and acid fluoride groups are essentially eliminated, either simultaneously or independently.

SUMMARY OF THE INVENTION

It is therefore a general object of this invention to provide a novel, either hot-pressed or extruded optical body from a pressable powder of an ionic fluoride which body is essentially free of absorption bands, due to carbon dioxide, free water, hydroxyl ion and acid fluorides.

It is another general object of this invention to provide either a hot-pressed or extruded optical body of a powder fluoride of an alkaline earth metal, alkali metal or rare earth metal, or a powder double fluoride of the foregoing metals with each other, or with other elements, which powder is capable of being either hot-pressed or extruded using presently available materials of construction and conventionally used temperatures and pressures for this purpose.

It is also a general object of this invention to provide a novel method for either hot-pressing or extruding an optical body from a pressable powder of an ionic fluoride comprising contacting the powder prior to compaction, with a reactive reducing gas optionally in combination with a compound capable of generating HF gas, and compacting the powder under conditions from about 450° to about 800° C, and about 2000 psi to about 50,000 psi, to yield an optical element which is essentially free of absorption bands, due to carbon dioxide, free water, hydroxyl ion and acid fluorides.

It is another general object of this invention to provide a method for making an optical body including chemically removing impurities, comprising contacting a powder fluoride of an alkaline earth metal, alkali metal or rare earth metal, or a powder double fluoride of the foregoing metals with each other or with other elements, with a reactive reducing gas, or HF gas, or both, and either hot-pressing or extruding the powder which is not itself reduced or altered by reaction with the reducing gas, using presently available materials of construction and conventionally used temperatures and pressures for either operation. The method applies to all ionic fluorides hot-pressable into an absorption-free body, which fluorides have common absorption characteristics, and are subject to pyrohydrolysis at pressing temperature.

It is a more specific object of this invention to provide a novel hot-pressed optical body of an alkaline earth metal fluoride, alkali metal fluoride or rare earth metal fluoride powder, characterized by relatively high transmittance to ultraviolet, visible and near infrared radiation, with essentially no absorption bands for one or all of the following groups: carbon dioxide, water, hydroxyl and acid fluorides. This high quality hot-pressed optic stems from the discovery that contacting a pulverulent porous mass of an ionic fluoride in a die cavity with a reactive, reducing gas such as hydrogen, and additionally, with HF gas at a temperature in excess of about 300° C but below the melting point of the powder, to remove contaminants, immediately before it is hot-pressed, an optical body of exceptionally high quality is produced.

It has also been discovered that, depending on the end use of an optical body obtained from either a hot-pressed slug or an extrudate of a powder ionic fluoride, the absorption band or bands due to each impurity may be reduced or eliminated, sequentially or simultaneously, as desired.

It is a more specific object of this invention to provide a high-quality hot-pressed ionic fluoride optic of arbitrary thickness having less than 0.01 mm⁻¹ absorption in the range from about 1 $\mu$ to about 7 $\mu$ wavelength due to one or more impurities chosen from carbon dioxide, water, hydroxyl ion and acid fluorides.

It is another more specific object of this invention to provide a hot-pressed magnesium fluoride optical body of arbitrary thickness which is essentially free of absorption bands in the wavelength range of from about 2 $\mu$ to about 7 $\mu$; a similar body of calcium fluoride which is essentially free of absorption bands in the wavelength range from about 1 $\mu$ to about 7 $\mu$; and a similar body of lead fluoride which is essentially free of absorption bands in the wavelength range from about 2 $\mu$ to about 14 $\mu$.

These and other objects, features and advantages of the hot-pressed article of this invention will become apparent to those skilled in the art from the following description of preferred forms thereof and the illustrations set forth herein.

BRIEF DESCRIPTION OF THE DRAWINGS

The invention is illustrated in the accompanying drawings wherein.

DETAILED DESCRIPTION OF PREFERRED EMBODIMENTS OF THE INVENTION

Figure 1:
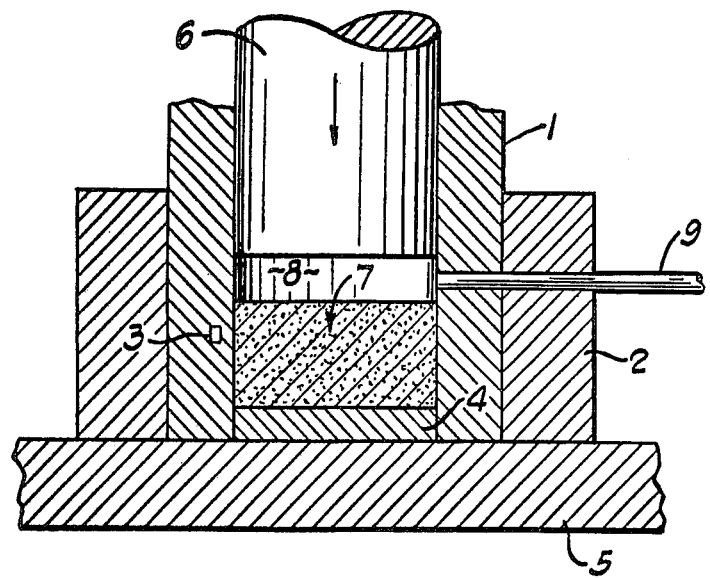
FIG. 1 is an elevation section of a mold with parts broken away and a portion of the bed of a press.

In one embodiment of this invention, essentially pure magnesium fluoride powder in the size range from about 5 $\mu$ to about 44 $\mu$ is dried to less than about 200 parts per million (ppm) free water, in an inert atmosphere. The dried powder is lightly compacted in a mold, treated with a reactive, reducing gas as will be described hereinafter, and thereafter hot-pressed under conditions of high temperature and high pressure into an optical body of polycrystalline magnesium fluoride. The mold may be of any suitable shape and construction as is conventionally used in the manufacture of ionic fluoride hot-pressed optical bodies. Suitable molds are described in U.S. Pat. Nos. 3,294,878; 3,431,326; etc. and are commonly provided with a heatable mold to which an inert gas is supplied, or alternatively, which may be surrounded by a vacuum. The mold includes a die comprising an anvil which is retained within the mold and a plunger movable vertically along the axis of the mold relative to the anvil. The space between the plunger and the anvil is referred to as the die cavity.

A 'charge' of pressable powder is placed on the anvil. By 'pressable powder' we refer to an ionic fluoride powder having a suitable particle size which permits particles to be collapsed or coalesced and moved around under compacting pressure. Thus an optical body is formed by yielding of particles, under pressure, in the final stages of compaction which produces voids having effective diameters too small to interfere with the wavelength of light to be transmitted. This avoids scatter and distinguishes between marble-like solids and transparent optical bodies, though each is formed of the same compound. If desired the powder may be lightly compacted so as to present a loose, highly porous, gas permeable mass, and this is the normal condition of the charge with the plunger resting on or supported above it. A description of simple equipment, used prior to the aforementioned patents for the hot-pressing of fluorides is found in "Study of Non-Oxide Materials with Defect Structures" by Buckner, D. A. and Kreidle, N. J., Report No. 293,144 published by the Armed Services Technical Information Agency. This report also lists numerous fluorides, including double fluorides, all of which may be used to form the hot-pressed optical body of this invention, and are incorporated by reference herein.

The difficulty of removing carbon dioxide, referred to hereinabove, from relatively thick hot-pressed optics has been overcome by reducing carbon dioxide to carbon monoxide, which is more easily driven from the powder than carbon dioxide. This reduction is accomplished by contacting the powder in the die cavity with a reactive reducing gas capable of reducing carbon dioxide to carbon monoxide at a temperature in the range above about 500° C. but below the melting point of said powder, for a sufficient time while maintaining said temperature and said powder in a porous gas-permeable mass.

Any gaseous compound, which yields a reducing agent capable of reducing carbon dioxide, may be used, provided the compound does not adversely affect the transmission spectra of the finished article, either because of chemical reaction with the ionic fluoride or because of being retained thereon. It is not essentially that the compound be introduced as a gas, but only that the compound be capable of yielding the reducing agent as a gas under conditions effective to reduce $CO_2$ to an easily dissociable form. It is important that the reducing agent be gaseous so as to permit contacting of all, or nearly all the powder particles.

A convenient reducing agent is hydrogen gas or a compound capable of generating hydrogen. For maximum reduction, gaseous hydrogen is flowed directly into the charge. The amount of hydrogen flowed into the charge of powder is not critical, but it is preferred to flow in sufficient gas to prevent back-flow of air into the die cavity. The precise rate of flow of gas will depend in part upon the amount of powdered material in the die cavity which is to be hot-pressed.

The treatment with a reducing gas such as hydrogen for the removal of carbon dioxide is completed prior to the compaction of the powder. It is generally found that once pressures in excess of about 50,000 psi are exerted on the powder in the die cavity, any $CO_2$ remaining therein, along with any other remaining gases will be trapped. Recognizing that some reducing gas will normally be entrapped, it is preferred to use a gas which does not exhibit an absorption band when the optical body is used in the desired wavelength range.

Dilution of hydrogen with an inert gas such as nitrogen, argon, or helium in the ratio of hydrogen to nitrogen of about 4:96 is an acceptable safety measure to avoid explosive mixtures. This does not detract from the effectiveness of the hydrogen in this process since contact with the powder is limited by diffusion rather than by concentration.

The duration of contacting the powder with the reactive reducing gas is related to the amount of powder in the die cavity, the flow rate of gas and the level to which $CO_2$ impurity is to be reduced. It will be found, that with longer times of contact, more $CO_2$ will be reduced and, with sufficient contact, all traces of $CO_2$ as evidenced by absorption at 4.2 $\mu$ in the transmission spectra of the optical body may be eliminated. Surprisingly, transmission spectra recorded on a Perkin Elmer Model 521 of relatively high sensitivity and resolution, fail to show absorption due to $CO_2$ on 3 mm sections cut from properly treated hot-pressed bodies up to 3 inches thick. With similar treatment and due care, even greater thicknesses of similar quality may be formed.

It will be understood that flow of hydrogen outside the die cavity will not be as effective as flow directly into the powder charge, particularly if, as is usual, a plunger rests on or above the powder within the die cavity, with some clearance or other restricted vent for the escape of gas.

The temperature may be varied within relatively wide limits, depending mainly on the reducing agent used and the rate of reduction desired. Optimum results with hydrogen are generally observed at a temperature in excess of about 500° C. Contacting the powder with a reactive reducing gas at temperatures below 500° C. may act much as an inert gas sweep to diminish $CO_2$ but not eliminate it. In some cases, such as the hot-pressing of lithium fluoride, where the hot-pressed optical body may be formed at a relatively low temperature of about 400° C. or less, the charge may have to be preheated to effect reduction prior to being compacted.

It is recognized that in the reduction of carbon dioxide, water is expected to be formed. Thus, though a reduction of carbon dioxide to the level desired may be obtained, the level of free water and hydroxyl groups present may be expected to be increased. Also, contingent upon temperature, this water vapor may react with the ionic fluoride to form hydroxy fluoride salts and gaseous HF. On subsequent cooling, after pressing, entrapped HF produces acid fluoride salts that exhibit a series of absorption bands along with the $OH^-$ absorption from the hydroxy-fluoride. Even though the grain size is small (about 1 to 10 $\mu$), the $OH^-$ is thought to exist as a substitutional impurity in the ionic crystal lattice while the acid fluorides are surface cations within minute void spaces.

To help sweep out the water formed, it is preferred to use a fluorine-containing material capable of releasing hydrofluoric acid. Introduction of a fluorine compound capable of releasing hydrofluoric acid provides another advantage, namely that of reducing and eliminating hydroxyl groups irrespective of how they happen to be present in the powder and where they occur as absorption bands in the transmission spectra in the range from about 1 $\mu$ to about 14 $\mu$. The most conspicuous absorption band due to $OH^-$ occurs at 2.8 $\mu$. A preferred fluorine-containing material is ammonium fluoride which may be incorporated within the charge, provided the die cavity is ventillated, that is, permits passage of gases out of the cavity. Other useful fluorine-containing materials are ammonium bifluoride, solids such as sodium acid fluoride which set free HF upon heating, and anhydrous hydrofluoric acid. The fluorine-containing material may be introduced by itself, regardless of whether or not the powder has been treated for reduction of $CO_2$ to CO. However, when $CO_2$ is to be reduced, it is preferred to introduce the fluorine-containing material either with the $CO_2$-reducing agent or after the $CO_2$ impurity has been reduced. It is also preferred to introduce the fluorine compound continuously over a prolonged period of time, rather than all at once. Typically treatment of a charge is over a period in the range from about an hour to about 12 hours.

The time of treatment of the powder with the fluorine-containing material is not critical and may be varied over a wide range depending upon the size of the charge, the temperature at which the charge is maintained and the degree of reduction in $OH^-$ absorption desired in the transmission spectra. The temperature of treatment may also be varied within wide limits provided it is high enough to produce the necessary scavenging of $OH^-$ groups without being deleterious to the transmittance of the finished hot-pressed optic.

Surprisingly, the treatment of the charge, continuously, with a fluorine compound capable of generating HF, effectively eliminates the absorption bands due to acid fluorides (including $HF_2^-$ and related ions) which are otherwise inevitably present. This is particularly unexpected because finished hot-pressed optics formed as described in the Letter U.S. Pat. Nos. 3,114,601 and 3,312,759 display prominent absorption bands due to acid fluorides at 2.9 $\mu$ and 5.0 $\mu$, and other weak acid fluoride bands at still other frequencies. Prior art optics formed by the techniques of the aforesaid patents may also display prominent absorption bands due to $NH_4^+$ at 3.3 $\mu$ and 7 $\mu$, mainly due to a lack of ventilation of the die cavity and the inadequacy of disclosed fluorine compounds, particularly solid ammonium fluoride, introduced batch-wise in the charge, rather than continuously.

Continuous flow of a gas stream through or over the charge prior to final compaction, sweeps away impurities from within the charge, and prevents contamination due to re-entry of impurities more effectively than maintaining a vacuum in the molding chamber. Absorption bands result from entrapped gases that are not liberated until extremely high pressure is applied. This gas evolution was noted by Carnall in U.S. Pat. No. 3,365,271 (see col. 3 line 40) and in open dies is so forceful as to emit a sound when charges larger than 100 gm. of powder are pressed. Surrounding the die with a negative pressure cannot remove this gas before the powder is pressed, or aid the escape of the gas during pressing, because an additional 760 mm. (approx.) cannot reasonably be expected to accelerate the flow of gas generated under a pressure in excess of 20,000 psi.

Pressed ionic fluoride optics may be formed in accordance with the teachings of this invention, essentially completely free of $CO_2$, $H_2O$, $OH^-$, $NH_4^+$ and acid fluoride impurities in the range from about 1.0 $\mu$ to about 7.0 $\mu$. When a lesser quality optic is desired, a predetermined reduction of impurities may be effected. Moreover, any particular impurity may be reduced or eliminated simultaneously. With particular reference to magnesium fluoride it will be found that scatter in the wavelength range less than 2 $\mu$ is generally so great that absorption bands, or lack thereof, due to impurities present, is of no especial importance.

In the foregoing discussion it is recognized that, for preparing hot-pressed magnesium fluoride, compaction is accompanied by x-ray diffraction changes for transition from a hydrous fluoride to ionic $MgF_2$ while for the other fluorides of alkaline earth metals, alkali metals and rare earth metals no comparable solid-solid transition takes place. While this makes the amount of surface change and gas liberation greater for magnesium fluoride than for other fluorides, the problem of impurities which are to be reduced or eliminated in magnesium fluoride is endemic to all pressed fluoride optics. The degree of the absorption problem appears to be more temperature dependent than upon the particular cation of the fluoride. Absorption is more dependent upon the entrapped gases than upon the gas which can escape in the initial steps of compaction.

After the charge of pressable powder is treated for removal of such impurities as are present, to the extent desired, the temperature of the charge is raised or lowered to the desired final pressing temperature. Pressing temperatures below the treating temperature may be needed to deal with solid-solid phase change: for example with $PbF_2$ at 315° C and $BiF_3$ at 215° C. When the dense, room temperature stable form is required, these salts are pressed at about 300° and 200° C respectively after treating with reducing gas plus a trace of HF at about 500° C to destroy the adsorbed $CO_2$ and $H_2O$ vapor on their surface. Flow of reducing gas to the charge is maintained, and the plunger is slowly lowered against the charge until sufficient pressure is exerted to form a polycrystalline optic. The same safeguards are desirable as those used in the usual hot-pressing of ionic fluoride optics utilizing conventional equipment and materials and construction.

Now referring particularly to a section elevation of a portion of a press used to form the hot-pressed optics of this invention, there is illustrated in FIG. 1 a portion of a cylindrical barrel 1, around which is disposed a furnace 2 with means to heat the barrel 1 to any predetermined temperature. Around the furnace 2 is preferably disposed insulating means (not shown in the drawing), and within the barrel 1 near the inside wall, is embedded a thermocouple 3 to monitor the temperature. A removable anvil 4 is slidingly disposed within the barrel 1 and rests on the bed 5 of the press. A plunger 6 is slidably inserted within the barrel 1 to form a die cavity 8 of variable volume, in which a charge of pressable powder 7 is placed. The plunger 6 is supported by means exteriorly of the die cavity (not shown), above the surface of the powder which is maintained in a highly porous, gas permeable condition.

Intermediate the anvil 4 and the face of the plunger 6 there is provided a conduit 9 through which hydrogen and HF gases may be introduced directly into the powder charge 7, diffusing therethrough and escaping from the die cavity 8 around the plunger 6. It is preferred to flow the gases into the charge near its surface, or even above the surface, to avoid plugging the conduit 9. Diffusion of the gases is effected by maintaining the flow of gas for a period of at least 2 hours, and more preferably, for from about 4 to about 12 hours, depending on the size of the charge. Instead of introducing gaseous HF with the hydrogen, the charge may be wetted with an ammonium fluoride solution, or 'spiked' with a small amount of ammonium bifluoride flakes. The amount of $NH_4F$ solution of $NH_4HF$ flakes is not critical and is easily arrived at, depending on the level of OH and acid fluorides impurity one is willing to tolerate.

According to a preferred embodiment of this invention gas flowed into the die cavity 8 to contact the powder 7 is a hot non-explosive mixture of hydrogen and nitrogen (4% $H_2$) which has been contacted with ammonium fluoride prior to introducing it into the die cavity. Means are provided (not shown) for controlling the temperature, pressure and flow of gas into the die cavity.

In another embodiment of this invention an extrudable powder, such as pure lithium fluoride powder having a particle size in the size range from about 5 microns to about 100 U.S. standard mesh, is dried to less than about 200 parts per million free water in an inert atmosphere. An extrudable powder is generally any pressable powder having a predetermined particle size, generally less than about 7 mesh, capable of yielding an optical body. The dry powder is lightly compacted in a mold above an orifice through which it is to be extruded, and treated with a reactive reducing gas such as hydrogen, as will be described hereinafter. The treated powder is then extruded under conditions of high temperature and high pressure into an optical body of polycrystalline lithium fluoride. The mold may be of any suitable construction such as is conventionally used in the extrusion of crystalline powders. Suitable molds are described in U.S. Pat. No. 3,532,777.

Figure 2:
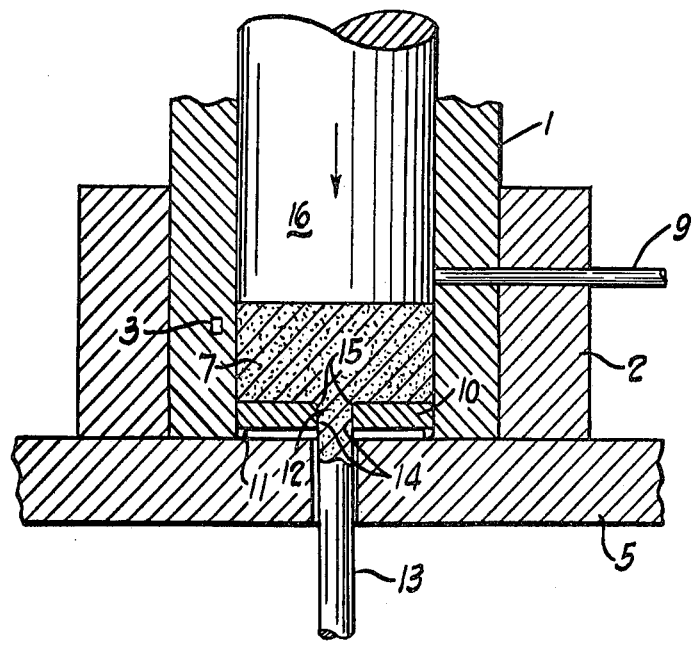
FIG. 2 is an elevation section of a ram-type extruder with parts broken away, after extrusion is commenced.

Now referring particularly to a section elevation of a portion of a ram-type extruder used to extrude a pressable or extrudable powder fluoride, there is illustrated in FIG. 2 a portion of a cylindrical barrel 1 around which is disposed insulating means (not shown), and within the barrel 1, near the inside wall is embedded a thermocouple 3 to monitor the temperature.

A removable die means 10 is slidingly disposed within the barrel 1 and rests on a spacing ring 11 on the bed 5 of the press. A ram 16 is slidably inserted within the barrel 1 to form a die cavity 8 of variable volume, in which a charge of extrudable powder 7 is placed. The ram 16 is supported by means (not shown) exteriorly of the die cavity, above the surface of the powder which is maintained in a highly porous, gas permeable condition. In practice, the powder is lightly compacted so it does not flow out of the orifice 12 in the die means. The cross-section of the orifice 12 corresponds to the cross-section of the extrudate 13 to be formed. The die means 11 is undercut at 14 and the edges 15 are rounded so as not to tear the surface of the extrudate. The entire assembly is supported on the bed 5 of the press which bed has an opening under the orifice 12 for passage of the extrudate.

As in the embodiment describing hot-pressing a powder, intermediate the die means 10 and the face of the ram 16 there is provided a conduit 9 through which reducing gas may be introduced directly above the powder charge 7, diffusing therethrough and escaping from the die cavity 8 around the ram 16. If desired, the reducing gas may be introduced through the orifice 12 or through a point intermediate the mass of powder, whichever is most convenient. It will thus be apparent that utilizing the method of this invention, an optical body may be formed from either a pressable or an extrudable ionic fluoride of an alkaline earth metal, alkali metal or rare earth metal, or a double fluoride of the foregoing metals with each other, or with other elements. The ionic fluoride may be represented by the general formula $M_mF_n$ wherein M represents one or more elements chosen from an alkali metal, an alkaline earth metal and a rare earth metal, in any combination therebetween, including elements of the same group, or in combination with an element of Groups III, IV, V, VI, VII or VIII of the Periodic Table, $m$ is an integer representing the number of atoms of said one or more elements and $n$ is an integer which satisfies the valence requirements of $M_m$, excluding elements whose fluorides react with the reducing gas used at the temperature of treatment (above 400° to about 800° C). In addition to the fluorides and combinations disclosed hereinabove, the process is applicable to the following fluorides and combinations thereof: $BeF_2$; $ZnF_2$; $CdF_2$; $AlF_3$; $GaF_3$; $Li_3AlF_6$; $Na_3AlF_6$; $K_3AlF_6$; $KAlF_4$; $K_3GaF_6$; $KGaF_4$; $RbGaF_4$; $CsGaF_4$; $ScF_3$; $YF_3$; $(RE)F_3$; $NaCeF_4$; $UF_4$; $PbF_2$; $K_2TiF_6$; $BiF_3$; $Na_2NbF_7$; $CrF_3$; $CrF_2$; $K_3CrF_6$; $NiF_2$; $CoF_2$; $K_2NiF_4$; $KNiF_3$; and the like.

In the following examples, transmission spectra have been recorded with a spectrophotometer of relatively high sensitivity and resolution. It will be recognized that, with relatively insensitive instruments, the absorption bands with which we are concerned may be partially or totally obscured.

EXAMPLE 1

Figure 3:
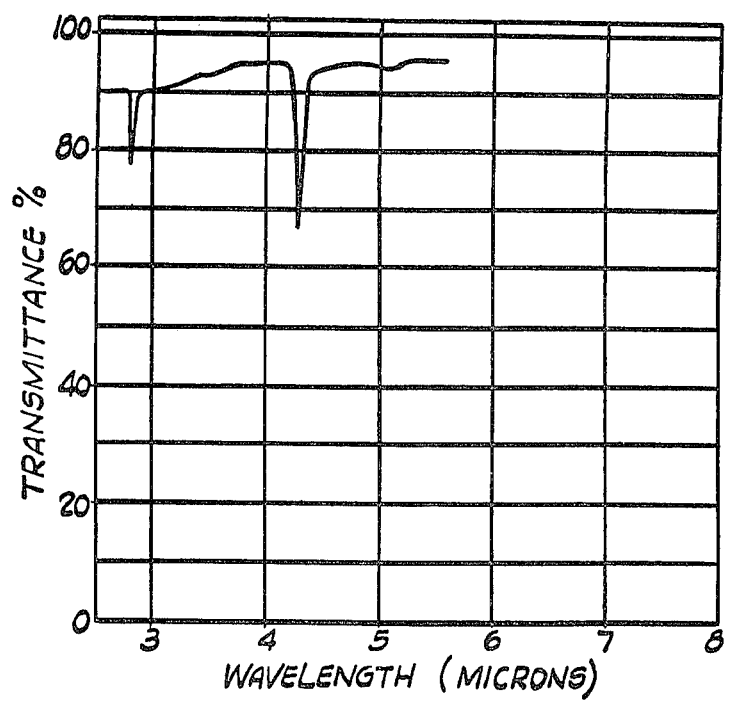
FIG. 3 is a graph showing a representative transmission spectra of a hot-pressed magnesium fluoride optical 'flat' about 2 mm thick, made according to the prior art.

A. A charge of 950 gms. of pressable magnesium fluoride powder which has previously been dried to less than 200 ppm free moisture is placed in a 3.5 in. diameter barrel in which an anvil has been inserted. The charge of pressable powder is lightly tamped. The surface of the charge is about 11 inches above the anvil. The plunger is inserted in the barrel and is supported so that the face of the plunger is a short distance above the surface of the powder. The charge of powder is then heated gradually until the temperature of the charge reaches about 600° C. Hot nitrogen gas is flowed into the die cavity and the flow of gas is continued for a period of about 6 hours, the gas being permitted to escape slowly around the periphery of the plunger. Thereafter the plunger is gradually lowered under a load of about 300 tons. The load is maintained for a period of about 10 minutes to obtain maximum degassing of the charge and sufficient compaction of the powder. A thick polycrystalline slug is formed which has desirable optical properties. The entire assembly is permitted to cool and the slug removed therefrom. A portion of the slug is cut and polished to yield a disc or 'flat' approximately 0.078 in. thick. The transmission spectra for the flat, recorded as depicted in FIG. 3, shows absorptions due to carbon dioxide, hydroxyl ion and acid fluorides.

Figure 4:
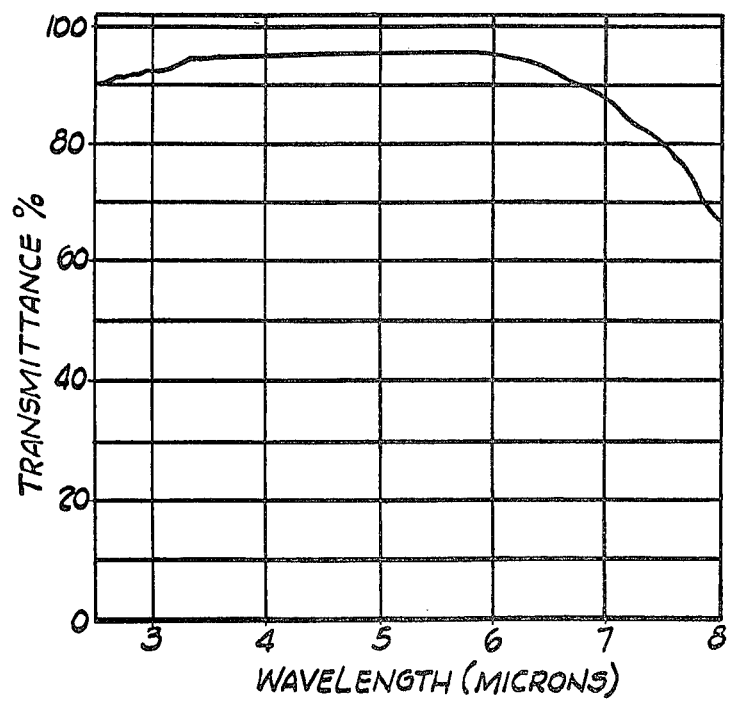
FIG. 4 is a graph showing a representative transmission spectra of a hot-pressed magnesium fluoride optical 'flat' about 2 mm thick, made according to this invention.

B. Another charge of pressable magnesium fluoride powder, which is a portion of the same powder used in Example 1A hereinabove, is prepared for hot-pressing in a manner analogous to that described hereinabove. Instead of nitrogen, a hot reducing gas, comprising 4 percent hydrogen and 96 percent nitrogen, is first contacted with ammonium fluoride flakes at about 400° C., and then conducted into the die cavity in the space intermediate the surface of the powder and the face of the plunger. Hot-pressing is then effected under the same conditions as those used in Exaple 1A above. A portion of the slug formed is cut and polished; the transmission spectra of the flat about 2.5 mm (0.084 inch thick) recorded as in FIG. 4. It will be noted that this spectra is essentially free of absorption bands due to carbon dioxide, hydroxyl ion and acid fluorides. Measurements indicate that the absorption due to impurities in the flat is less than 1 percent per millimeter of thickness (0.01 mm$^{-1}$) due to absorption bands in the transmission spectra of the flat within a wavelength in the range from about 1$\mu$ to about 7$\mu$.

Transmission spectra of both treated and untreated magnesium fluoride flats are seen to be in excess of 90 percent for a major portion of the wavelenth range from about 2 $\mu$ to about 7 $\mu$. It is recognized that not all ionic fluorides treated in accordance with this invention will display a transmittance in excess of 90 percent without correction for reflection losses in a predetermined wavelength range, and that such high transmittance is not critical even in optical bodies. However where a high-quality optical body is sought, a transmittance in excess of 90 percent without correction for reflection losses for at least a portion of the wavelength range from about 1 $\mu$ to about 7 $\mu$, and more preferably in a major portion of the wavelength range from about 2 $\mu$ to about 7 $\mu$, is desirable. This criterion is specifically met by hot-pressed bodies of magnesium fluoride and calcium floride respectively, among other ionic fluorides.

EXAMPLE 2

In a manner analogous to that described in example 1 hereinabove a pressable charge of calcium fluoride is treated with hydrogen reducing gas diluted with helium. The powder is hot-pressed at a temperature of about 600° C. and sufficient pressure to yield a thick slug which is found to be essentially free of absorption bands due to the impurities described hereinabove.

EXAMPLE 3

In a manner analogous to that described in Example 1 hereinabove a pressable charge of dysprosium fluoride is treated for 6 hours at a temperature in excess of 500° C. with hydrogen reducing gas and thereafter compacted to form an optical body. Transmission spectra for a cut and polished portion of the optical body indicate that it is essentially free from absorption bands due to impurities described hereinabove.

EXAMPLE 4

In a manner analogous to that described in Example 1 hereinabove, a pressable charge of potassium magnesium fluoride is treated with hydrogen reducing gas diluted with nitrogen and thereafter compacted under elevated temperature and pressure to form an optical body. A portion of the optical body is cut and polished and the transmission spectra examined. The transmission spectra is essentially free from absorption bands due to impurities described hereinabove.

EXAMPLE 5

A charge of extrudable lithium fluoride powder all of which passes 80 mesh is placed in the barrel of a ram-type extruder which is heated to a temperature of about 500° C. The orifice of the die means is temporarily plugged and the powder charge is lightly compacted within the barrel. In a manner analogous to that described in Example 1A hereinabove, hot nitrogen is introduced above the surface of the powder charge and the flow of gas is continued for a period of about 6 hours permitting the gas to diffuse through the charge. About 10 gms. of ammonium fluoride flakes is distributed throughout the charge. Thereafter the temperature of the charge is lowered to about 400° C. and the ram of the extruder is loaded to exert a pressure of about 10,000 spi. The plug from the orifice is removed and the ram is lowered against the powder under a pressure in excess of about 10,000 psi. An extrudate is formed which has exceptionally good optical properties.

In a manner analogous to that described hereinabove in this example, an extrudable powder charge of lithium fluoride is contacted with hydrogen and nitrogen in a ratio of 4/96, for a period of 6 hours, permitting the gas to diffuse through the charge. Portions of each extrudate are cut and polished. The transmission spectra indicate that the untreated extrudate has absorption bands for carbon dioxide, hydroxyl ion, and acid fluorides, while the treated extrudate is esentially free of these absorption bands.

EXAMPLE 6

In a manner analogous to that described in Example 1 hereinabove, a pressable charge of lead fluoride (PbF$_2$) is treated at about 500° C with hydrogen reducing gas diluted with nitrogen and thereafter compacted at about 300° C at a pressure sufficient to form an infrared transmitting body. A portion of the optical body is cut and polished and the transmission spectra is found to be essentially free from absorption bands due to impurities described hereinabove in the range from about 2 $\mu$ to about 14 $\mu$.

EXAMPLE 7

In a manner analogous to that in Example 1 hereinabove, a pressable charge of bismuth fluoride (BiF$_3$) is treated at about 500° C with hydrogen reducing gas diluted with nitrogen and thereafter compacted at about 200° C and sufficient pressure to form an infrared transmitting body. A portion of the body is cut and polished and the transmission spectra is found to be essentially free from absorption bands due to impurities described hereinabove.

EXAMPLE 8

In a manner analogous to that described in Example 1 hereinabove a pressable charge of lithium aluminum fluoride ($Li_3AlF_6$) is treated at about 500° C with hydrogen reducing gas diluted with nitrogen and thereafter compacted at about 600° C at a pressure sufficient to form an infrared transmitting body. A portion of the optical body is cut and polished and the transmission spectra is found to be essentially free from absorption bands due to impurities described hereinabove.

In each of the examples hereinabove the optical body is characterized by a transmittance in excess of about 90% of that capable by a melt-grown ignot.

We claim:

1. A method for making a polycrystalline optical body from a pressable or extrudable powder of an ionic fluoride comprising contacting a porous gas-permeable mass of said powder in a cavity with a reducing gas at a temperature in excess of about 500° C but below the melting point of said powder, to prevent backflow of air into said cavity prior to compaction of said powder, and, optionally, with hydrogen fluoride gas at a temperature in excess of about 300° C but below the melting point of said powder, for a sufficient period of time to effect a predetermined reduction of an impurity selected from the group consisting of free water, carbon dioxide, hydroxyl ion and acid fluorides, and either hot-pressing or extruding said powder at a temperature in the range from about 300° to about 800° C, and pressure sufficient to form an optical body characterized by having less than about 1 percent per millimeter absorption due to absorption bands in the transmission spectra within a wavelength in the range from about 1 $\mu$ to about 7 $\mu$ wherein said absorption is due to at least one impurity selected from the group consisting of carbon dioxide, water, hydroxyl ion and acid fluorides.

2. The method of claim 1 wherein said reducing gas is hydrogen and said hydrogen fluoride gas is generated by a fluorine-containing material.

3. The method of claim 1 wherein said powder fluoride is of an alkaline earth metal, alkali metal or rare earth metal, or a double fluoride of the foregoing metals with each other, or with other elements, and said hydrogen fluoride gas is introduced concurrently with said reducing gas.

4. A method of making a polycrystalline optical body from a pressable or extrudable powder of an ioneiic fluoride comprising contacting a porous gas-permeable mass of said powder in a cavity with a reducing gas at a temperature in excess of about 500° C but below the melting point of said powder, to prevent backflow of air into said cavity prior to compaction of said powder, and, optionally, with hydrogen fluoride gas at a temperature in excess of about 300° C but below the melting point of said powder, for a sufficient period of time to effect a predetermined reduction of an impurity selected from the group consisting of free water, carbon dioxide, hydroxyl ion and acid fluorides, and either hot-pressing or extruding said powder at a temperature in the range from about 300° to about 800° C, and pressure sufficient to form an optical body characterized by a transmittance in excess of about 90 percent, without correction for reflection losses, in a major portion of the wavelength range from about 2 to about 7 microns, and less than about 1 percent per millimeter absorption due to absorption bands in the transmission spectra of said body within said range.

5. A method of making a polycrystalline optical body consisting essentially of a powder fluoride of an alkaline earth metal, alkali metal or rare earth metal, or a powder double fluoride of the foregoing metals with each other, or with other elements, comprising introducing a powder of said fluoride into a die cavity, heating said powder to a temperature in the range from above about 500° C. but below the melting point of said powder, flowing a stream of hydrogen gas into said die cavity for sufficient time, while maintaining said temperature, to prevent backflow of air into said cavity prior to compaction of said powder, and to remove carbon dioxide impurity associated with said powder, and hot-pressing said powder at a temperature of about 300° but below about 800° C, and at a pressure sufficient to permit in excess of about 90 percent transmittance for said element in a major portion of the wavelength range from about 2 to about 7 microns, and less than about 1 percent per millimeter absorption due to absorption bands caused by carbon dioxide in the transmission spectra of said body within said range.

6. The method of claim 1 including additionally, contacting said powder fluoride with hydrogen fluoride gas, or a compound capable of generating hydrogen fluoride gas, at a temperature in excess of about 300° C. but below the melting point of said powder.

7. The method of claim 6 wherein said optical body is formed in a thickness of at least about 2.5 millimeters.

8. A method of making a polycrystalline optical body from a pressable or extrudable calcium fluoride powder, comprising contacting said powder in a cavity with a reducing gas at a temperature in excess of about 500° C. but below the melting point of said powder, to prevent backflow of air into said vacity prior to compaction of said powder, and, optionally, with hydrogen fluoride gas at a temperature in excess of about 300° C. but below the melting point of said powder, for a sufficient period of time to effect a predetermined reduction of an impurity selected from the group consisting of free water, carbon dioxide, hydroxyl ion and acid fluorides, and either hot-pressing or extruding said powder at a temperature in the range from about 300° to about 800° C, and pressure sufficient to form an optical body characterized by a transmittance in excess of about 90 percent without correction for reflection losses, in a major portion of the wavelength range from about 1 to about 7 microns, and less than about 1 percent per millimeter absorption due to absorption bands in the transmission spectra of said body within said range.

* * * * *